(12) United States Patent
Tix et al.

(10) Patent No.: US 8,893,930 B2
(45) Date of Patent: Nov. 25, 2014

(54) INTERNAL VALVE TIP FILTER

(71) Applicant: Graco Minnesota Inc., Minneapolis, MN (US)

(72) Inventors: Joseph E. Tix, Hastings, MN (US); Mark T. Weinberger, Mounds View, MN (US); Daniel P. Ross, Maplewood, MN (US); Paul R. Quam, Brooklyn Center, MN (US); John S. Lihwa, Willowick, OH (US)

(73) Assignee: Graco Minnesota Inc., Minneapolis, MN (US)

( * ) Notice: Subject to any disclaimer, the term of this patent is extended or adjusted under 35 U.S.C. 154(b) by 149 days.

(21) Appl. No.: 13/660,094

(22) Filed: Oct. 25, 2012

(65) Prior Publication Data

US 2013/0153604 A1 Jun. 20, 2013

Related U.S. Application Data

(60) Provisional application No. 61/576,011, filed on Dec. 15, 2011.

(51) Int. Cl.
*B67D 7/80* (2010.01)
*B67D 7/76* (2010.01)
*B01D 35/02* (2006.01)

(52) U.S. Cl.
USPC ............ 222/189.06; 222/189.11; 222/146.2; 222/146.5; 210/429; 210/432

(58) Field of Classification Search
USPC ............... 222/189.06–189.11; 210/429, 430, 210/497.01, 497.03, 498, 232, 431
See application file for complete search history.

(56) References Cited

U.S. PATENT DOCUMENTS

| | | | |
|---|---|---|---|
| 2,524,820 A | 10/1950 | Miles | |
| 2,631,892 A | 3/1953 | Czarnecki, Jr. et al. | |
| 2,637,194 A | 5/1953 | Wahlin | |
| 2,664,312 A | 12/1953 | Czarnecki, Jr. et al. | |
| 2,705,663 A | 4/1955 | Gilbreath | |
| 2,967,112 A | 1/1961 | Kay et al. | |
| 3,065,918 A | 11/1962 | Hostetter | |
| 3,317,141 A | 5/1967 | Mann | |
| 3,708,118 A | 1/1973 | Keur | |

(Continued)

FOREIGN PATENT DOCUMENTS

| | | |
|---|---|---|
| JP | 2004243318 A | 9/2004 |
| KR | 930002781 B1 | 4/1993 |
| KR | 200500067311 A | 7/2005 |

OTHER PUBLICATIONS

International Search Report and Written Opinion from PCT Application Serial No. PCT/US2012/061919, dated Mar. 29, 2013, 11 pages.

*Primary Examiner* — Paul R Durand
*Assistant Examiner* — Vishal Pancholi
(74) *Attorney, Agent, or Firm* — Kinney & Lange, P.A.

(57) ABSTRACT

A fluid dispensing valve comprises a module, a discharge orifice, a valve stem and a filter. The module has a fluid inlet, a fluid outlet and a fluid passage connecting the fluid inlet and the fluid outlet. The discharge orifice is in fluid communication with the fluid outlet. The valve stem extends into the fluid passage to close-off the discharger orifice. The filter is disposed within the fluid passage and surrounds the valve stem.

21 Claims, 9 Drawing Sheets

(56) References Cited

U.S. PATENT DOCUMENTS

| | | | |
|---|---|---|---|
| 3,752,400 | A | 8/1973 | Calder |
| 3,889,881 | A | 6/1975 | Cunningham et al. |
| 4,146,179 | A | 3/1979 | Egli et al. |
| 4,598,841 | A | 7/1986 | Smiles |
| 4,613,079 | A | 9/1986 | Mains |
| 4,655,398 | A | 4/1987 | Liggett |
| 4,667,884 | A | 5/1987 | Braziel |
| 4,882,055 | A * | 11/1989 | Stamstad ............... 210/483 |
| 5,044,555 | A | 9/1991 | Youngeberg et al. |
| 5,829,644 | A * | 11/1998 | Brightwell et al. ...... 222/189.07 |
| 5,875,922 | A * | 3/1999 | Chastine et al. ............... 222/1 |
| 6,168,049 | B1 | 1/2001 | Bolyard, Jr. |
| 6,315,168 | B1 | 11/2001 | Bolyard, Jr. et al. |
| 6,613,220 | B2 * | 9/2003 | Golovatai-Schmidt ....... 210/130 |
| 6,722,508 | B2 * | 4/2004 | Parker et al. ............... 210/448 |
| 6,799,702 | B1 * | 10/2004 | Mercer et al. ............ 222/189.06 |
| 7,182,229 | B2 * | 2/2007 | Gould et al. ............... 222/389 |
| 7,264,717 | B2 * | 9/2007 | Gould et al. ............... 210/232 |
| 7,614,529 | B2 | 11/2009 | Bolyard, Jr. et al. |
| 7,699,243 | B2 | 4/2010 | Starke |
| 8,069,653 | B2 * | 12/2011 | Ganzer ..................... 60/286 |
| 8,201,717 | B2 * | 6/2012 | Varga et al. ............... 222/593 |
| 2008/0217360 | A1 | 9/2008 | MacLean et al. |

* cited by examiner

INTERNAL VALVE TIP FILTER

BACKGROUND

The present disclosure relates generally to systems for dispensing hot melt adhesive. More particularly, the present disclosure relates to filters for dispense modules having valves from which melted hot melt adhesive is applied.

Hot melt dispensing systems are typically used in manufacturing assembly lines to automatically disperse an adhesive used in the construction of packaging materials such as boxes, cartons and the like. Hot melt dispensing systems conventionally comprise a material tank, heating elements, a pump and a dispenser. Solid polymer pellets are melted in the tank using a heating element before being supplied to the dispenser by the pump. Because the melted pellets will resolidify into solid form if permitted to cool, the melted pellets must be maintained at temperature from the tank to the dispenser. This typically requires placement of heating elements in the tank, the pump and the dispenser, as well as heating any tubing or hoses that connect those components. Furthermore, conventional hot melt dispensing systems typically utilize tanks having large volumes so that extended periods of dispensing can occur after the pellets contained therein are melted. However, the large volume of pellets within the tank requires a lengthy period of time to completely melt, which increases start-up times for the system. For example, a typical tank includes a plurality of heating elements lining the walls of a rectangular, gravity-fed tank such that melted pellets along the walls prevents the heating elements from efficiently melting pellets in the center of the container. The extended time required to melt the pellets in these tanks increases the likelihood of "charring" or darkening of the adhesive due to prolonged heat exposure.

SUMMARY

According to the present invention, a fluid dispensing valve comprises a dispensing module, a discharge orifice, a valve stem and a filter. The module has a fluid inlet, a fluid outlet and a fluid passage connecting the fluid inlet and the fluid outlet. The discharge orifice is in fluid communication with the fluid outlet. The valve stem extends into the fluid passage to close-off the discharger orifice. The filter is disposed within the fluid passage and surrounds the valve stem.

DETAILED DESCRIPTION

Figure 1:
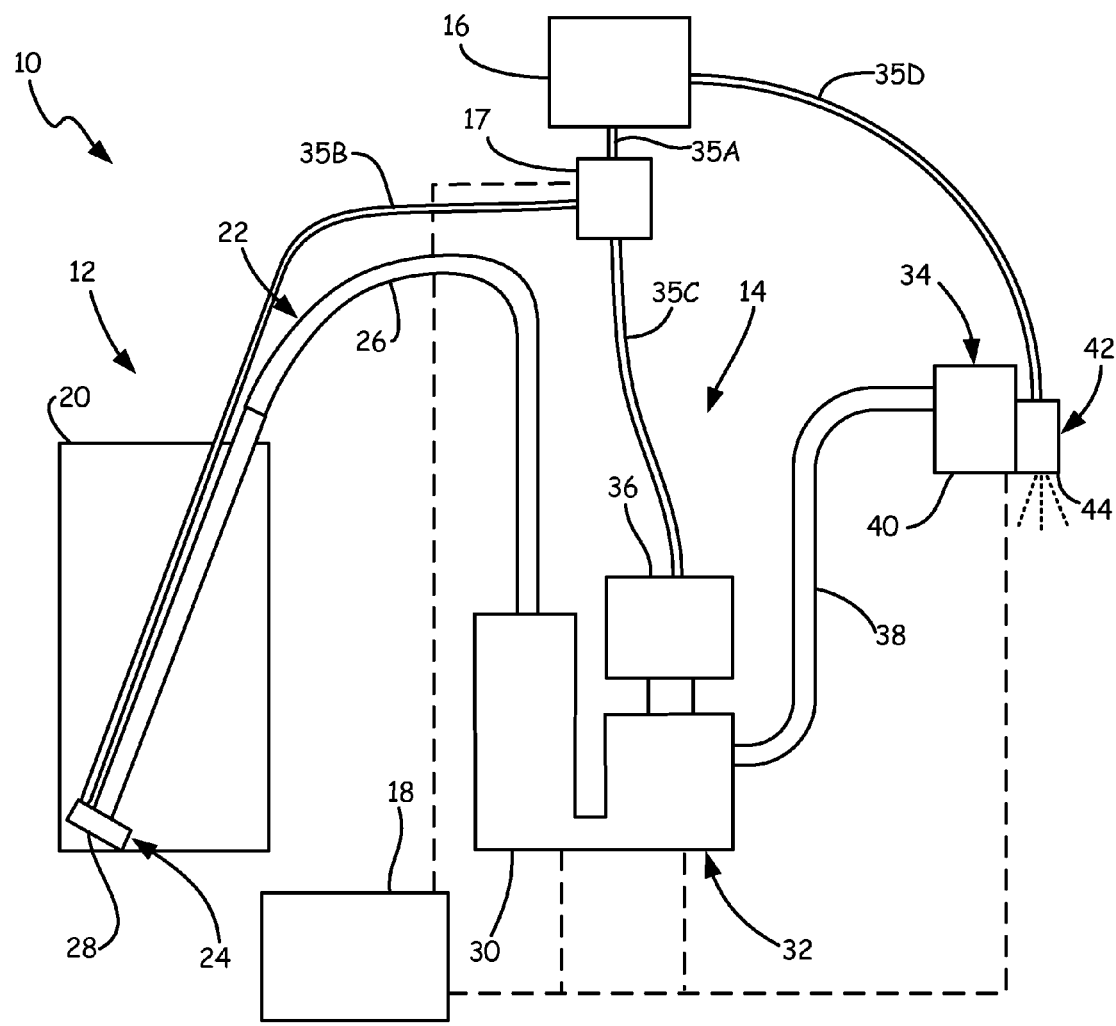
FIG. 1 is a schematic view of a system for dispensing hot melt adhesive.

FIG. 1 is a schematic view of system 10, which is a system for dispensing hot melt adhesive. System 10 includes cold section 12, hot section 14, air source 16, air control valve 17, and controller 18. In the embodiment shown in FIG. 1, cold section 12 includes container 20 and feed assembly 22, which includes vacuum assembly 24, feed hose 26, and inlet 28. In the embodiment shown in FIG. 1, hot section 14 includes melt system 30, pump 32, and dispenser 34. Air source 16 is a source of compressed air supplied to components of system 10 in both cold section 12 and hot section 14. Air control valve 17 is connected to air source 16 via air hose 35A, and selectively controls air flow from air source 16 through air hose 35B to vacuum assembly 24 and through air hose 35C to motor 36 of pump 32. Air hose 35D connects air source 16 to dispenser 34, bypassing air control valve 17. Controller 18 is connected in communication with various components of system 10, such as air control valve 17, melt system 30, pump 32, and/or dispenser 34, for controlling operation of system 10.

Components of cold section 12 can be operated at room temperature, without being heated. Container 20 can be a hopper for containing a quantity of solid adhesive pellets for use by system 10. Suitable adhesives can include, for example, a thermoplastic polymer glue such as ethylene vinyl acetate (EVA) or metallocene. Feed assembly 22 connects container 20 to hot section 14 for delivering the solid adhesive pellets from container 20 to hot section 14. Feed assembly 22 includes vacuum assembly 24 and feed hose 26. Vacuum assembly 24 is positioned in container 20. Compressed air from air source 16 and air control valve 17 is delivered to vacuum assembly 24 to create a vacuum, inducing flow of solid adhesive pellets into inlet 28 of vacuum assembly 24 and then through feed hose 26 to hot section 14. Feed hose 26 is a tube or other passage sized with a diameter substantially larger than that of the solid adhesive pellets to allow the solid adhesive pellets to flow freely through feed hose 26. Feed hose 26 connects vacuum assembly 24 to hot section 14.

Solid adhesive pellets are delivered from feed hose 26 to melt system 30. Melt system 30 can include a container (not shown) and resistive heating elements (not shown) for melting the solid adhesive pellets to form a hot melt adhesive in liquid form. Melt system 30 can be sized to have a relatively small adhesive volume, for example about 0.5 liters, and configured to melt solid adhesive pellets in a relatively short period of time. Pump 32 is driven by motor 36 to pump hot melt adhesive from melt system 30, through supply hose 38, to dispenser 34. Motor 36 can be an air motor driven by pulses of compressed air from air source 16 and air control valve 17. Pump 32 can be a linear displacement pump driven by motor 36.

In the illustrated embodiment, dispenser 34 includes manifold 40 and dispensing module 42. Hot melt adhesive from pump 32 is received in manifold 40 and dispensed via module 42. Dispenser 34 can selectively discharge hot melt adhesive whereby the hot melt adhesive is sprayed out outlet 44 of module 42 onto an object, such as a package, a case, or another object benefiting from hot melt adhesive dispensed by system 10. Module 42 can be one of multiple modules that are part of dispenser 34. In an alternative embodiment, dispenser 34 can have a different configuration, such as a handheld gun-type dispenser. Some or all of the components in hot section 14, including melt system 30, pump 32, supply hose 38, and dispenser 34, can be heated to keep the hot melt adhesive in a liquid state throughout hot section 14 during the dispensing process.

System 10 can be part of an industrial process, for example, for packaging and sealing cardboard packages and/or cases of packages. In alternative embodiments, system 10 can be modified as necessary for a particular industrial process application. For example, in one embodiment (not shown), pump 32 can be separated from melt system 30 and instead attached to dispenser 34. Supply hose 38 can then connect melt system 30 to pump 32.

Figure 2:
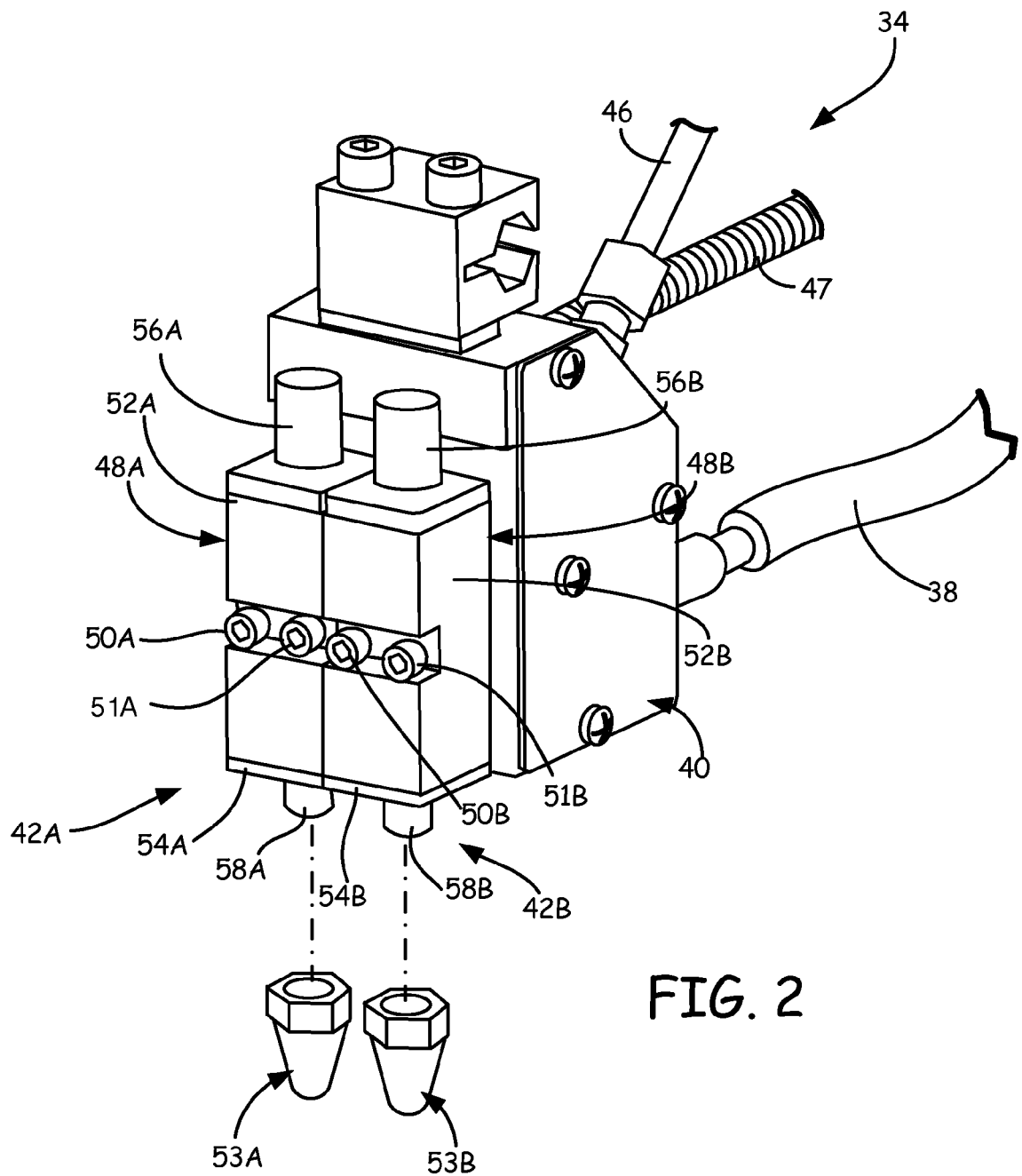
FIG. 2 is a perspective view of a hot melt manifold shown in FIG. 1 coupled to a dispense module having an internal valve tip filter of the present invention.

FIG. 2 is a perspective view of dispenser 34 of FIG. 1 comprising hot melt manifold 40 coupled to dispense modules 42A and 42B, which include an internal valve tip filter of the present invention. In the embodiment shown, manifold 40 includes inlet ports for receiving melted hot melt adhesive from supply hose 38, compressed air from air line 46 and control and power wires from conduit 47. Manifold 40 supplies both melted hot melt adhesive and compressed air to modules 42A and 42B. Modules 42A and 42B includes module housings 48A and 48B, which are connected to manifold 40 via fasteners 50A and 51A, and 50B and 51B, respectively. Modules 42A and 42B also include tips 53A and 53B, respectively. Module housing 48A comprises valve body 52A, which is connected to tip cap 54A and actuation cap 56A. Module housing 48B comprises valve body 52B, which is connected to tip cap 54B and actuation cap 56B. Actuation caps 56A and 56B provide access to valve stems within valve bodies 52A and 52B. Actuation caps 56A and 56B may also include vent ports (not shown) for discharging compressed air from air line 46 used to actuate the valve stems. Tip caps 54A and 54B include discharge ports 58A and 58B, respectively, which, in one embodiment, include valve seats having orifices that receive the tip of the valve stem. Tip caps 54A and 54B provide access to filters within valve bodies 52A and 52B. Configured as such, compressed air from air line 46 actuates the valve stems to open a hot melt fluid passageway from supply hose 38, manifold 40, module housings 48A and 48B and discharge ports 58A and 58B. The present invention relates to filters that are positioned within module housings 48A and 48B to prevent debris, such as charred hot melt material from clogging or plugging discharge ports 58A and 58B, or tips 53A and 53B.

Figure 3:
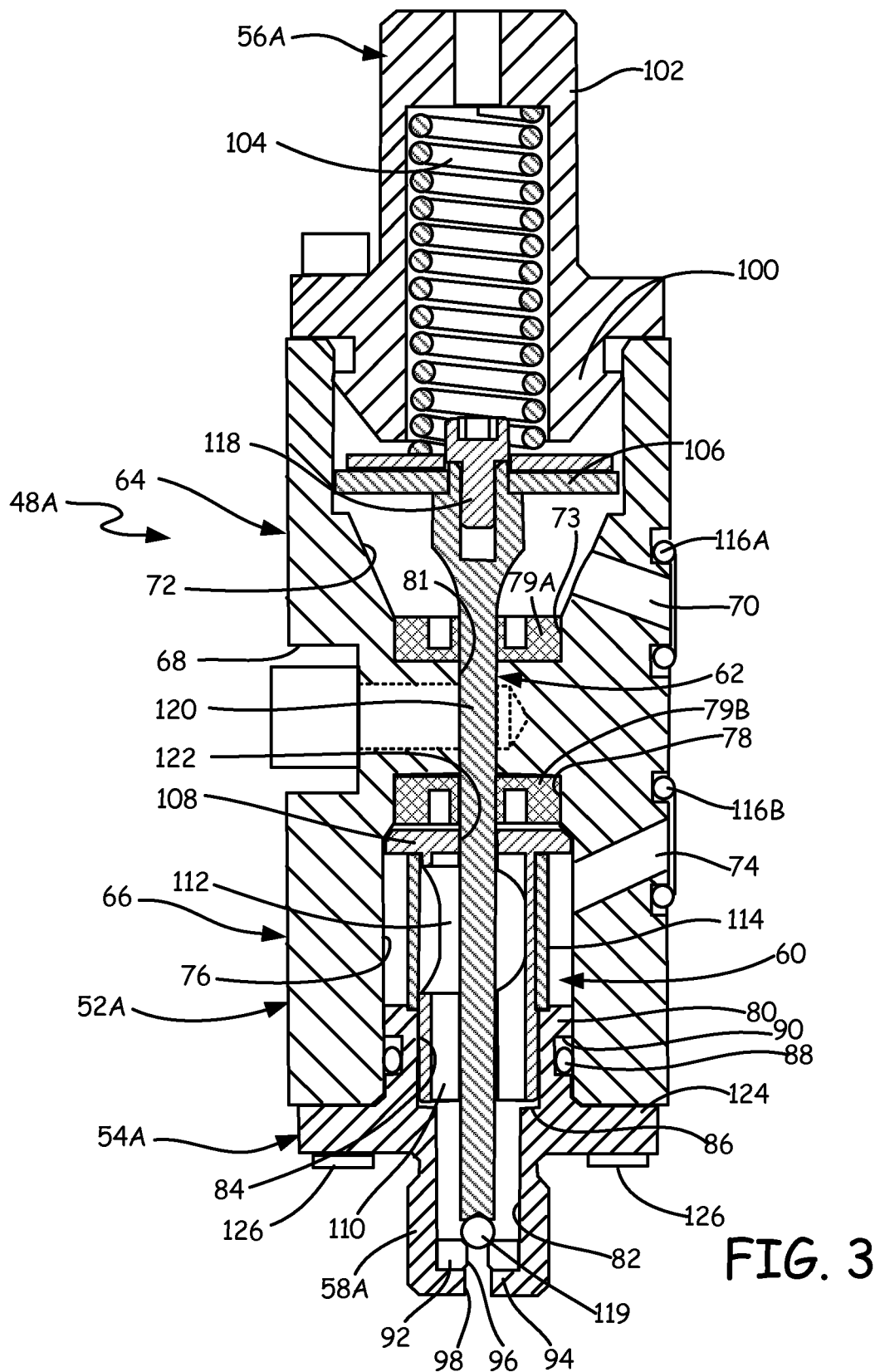
FIG. 3 is a cross-sectional view of the dispense module of FIG. 2 showing an outside-in embodiment of a tip filter surrounding a valve stem.

FIG. 3 is a cross-sectional view of module housing 48A of FIG. 2 showing tip filter 60 surrounding valve stem 62. Module housing 48A includes valve body 52A, which is connected to tip cap 54A and actuation cap 56A. Valve body 52A includes actuation portion 64 and valve portion 66. Actuation portion 64 includes slot 68, air inlet port 70, air port 72 and air seal bore 73. Valve portion 66 includes adhesive inlet port 74, valve passage 76 and adhesive seal bore 78. Seals 79A and 79B sit within seal bores 73 and 78, respectively, to seal around valve stem 62. Valve stem 62 extends through bore 81 in valve housing 52A to intersect air port 72 and valve passage 76.

Tip cap 54A includes collar 80 and discharge port 58A, which includes lower valve passage 82. Lower valve passage 82 includes counterbore 84 that forms edge 86. Tip cap 54A further includes seal 88, which is disposed in channel 90, and seat 92, which engages base 94 in lower valve passage 82. Seat 92 includes orifice 96, which aligns with opening 98 in discharge port 58A.

Actuation cap 56A includes plug 100 and tower 102. Spring 104 is positioned within tower 102. Plug 100 joins to actuation portion 64 to position spring 104 against piston 106, which is coupled to valve stem 62. Filter 60 includes seal ring 108, frame 110, window section 112 and filter media 114.

Slot 68 comprises a channel in which heads of fasteners 50A, 50B, 51A and 51B (FIG. 2) are disposed when used to join module housing 48A to manifold 40 (FIG. 2). As such, air inlet port 70 and adhesive inlet port 74 are pressed against discharge ports (not shown) in manifold 40 (FIG. 2) to receive compressed air and molten hot melt adhesive, respectively. Seals 116A and 116B, which can be embedded within channels in valve body 52A, are positioned around air inlet port 70 and adhesive inlet port 74 to prevent leaking of fluids from between manifold 40 and module housing 48A.

Plug 100 of actuation cap 56A holds tower 102 in engagement with valve body 52A to bias spring 104 against piston 106. Collar 80 of tip cap 54A holds discharge port 58A in engagement with valve body 52A to maintain seat 92 in a fixed position. Thus, spring 104 pushes valve stem 62 into engagement with seat 92 to prevent molten hot melt material from being discharged from module housing 48B.

Flow of compressed air from compressed air source 16 (FIG. 1) to module housing 48B is controlled by controller 18 (FIG. 1) to actuate valve stem 62 for desired intervals, thereby dispensing a corresponding amount of molten hot melt adhesive. Compressed air from air inlet port 70 enters air port 72 and pushes piston 106 upwards (with reference to FIG. 3) to compress spring 104. Through fastener 118, valve stem 62 is moved upward so that ball tip 119 of valve stem 62 is lifted from seat 92. This permits molten hot melt material from adhesive inlet port 74 to flow from valve passage 76 out orifice 96 and opening 98 in tip cap 54A. Seal 79A surrounds shaft 120 of valve stem 62 within actuation portion 64 and prevents air from entering valve portion 66. Likewise, seal 79B surrounds shaft 120 within valve portion 66 and prevents hot melt material from entering actuation portion 64. After a dispensing operation is complete, controller 18 (FIG. 1) ceases flow of compressed air to inlet port 70, which enables spring 104 to push valve stem 62 back into engagement with seat 92 and cuts-off flow of molten hot melt material from module housing 48A.

Filter 60 is positioned within valve body 52A to catch small particles of dust, dirt, char and the like before they are allowed to reach seat 92 and potentially form a clog. Filter 60 is maintained in position relative to adhesive inlet port 74 and valve stem 62 by engagement with tip cap 54A. Collar 80 of tip cap 54A extends into valve passage 76. Rim 124 joins collar 80 and discharge port 58A, and provides a plate through which fasteners 126 extend to join tip cap 54A to valve body 52A. Discharge port 58A extends from collar 80 such that lower valve passage 82 extends from counterbore 84. Seat 92 is positioned within lower valve passage 82 and includes orifice 96 that aligns with opening 98 of discharge port 58A. Valve stem 62 extends through filter 60 and into lower valve passage 82 such that ball tip 119 engages orifice 96 in seat 92. In one embodiment, ball tip 119 is coupled to shaft 120 such as by using a brazed joint. Filter 60 is inserted into collar 80, which includes counterbore 84 that forms ledge 86 upon which frame 110 rests. Collar 80 is inserted into valve passage 76 such that valve stem 62 is inserted into frame 110. In one embodiment, collar 80 comprises a cylindrical structure wherein its outer diameter surface engages tightly with valve passage 76 and its inner diameter structure engages tightly with frame 110. Furthermore, collar 80 may be threaded into valve passage 76.

Frame 110 and filter media 114 of filter 60 surround shaft 120 of valve stem 62 within valve passage 76. Seal ring 108 of frame 110 is positioned within valve passage 76 in proximity to seal 79B. Seal ring 108 is positioned upstream of fluid inlet 74. Seal ring 108 also includes bore 122 that permits valve stem 62 to enter into bearing 110. Bore 122 serves as a bearing or guide-hole that facilitates alignment of ball tip 119 with orifice 96. Seal ring 108 comprises a rim around the outside of frame 110 that engages the wall of valve passage 76 to assist seal 79B in preventing molten hot melt material from passing out of valve passage 76 through bore 81 in valve body 52A.

Filter media 114 surrounds a portion of frame 110 in which window section 112 is disposed. Filter media 114 extends across fluid inlet 74. Thus, in the disclosed embodiment of FIG. 3, filter 60 comprises an outside-in filter in which filtered matter is prevented from entering filter 60 and is left outside of filter 60. More specifically, molten hot melt material passes through filter media 114 from the outside and passes into the interior of frame 110 through windows formed by window portion 112. Once inside filter 60, molten hot melt material passes through an open end of frame 110 and into discharge port 58A and opening 98. Debris and particles screened-out by filter media 114 collect within valve body 52A between filter media 114 and the surfaces of valve passage 76. Tip cap 54A is removed from valve body 52A to clean or replace filter media 114 and remove collected particles from inside valve body 52A.

Figure 4:
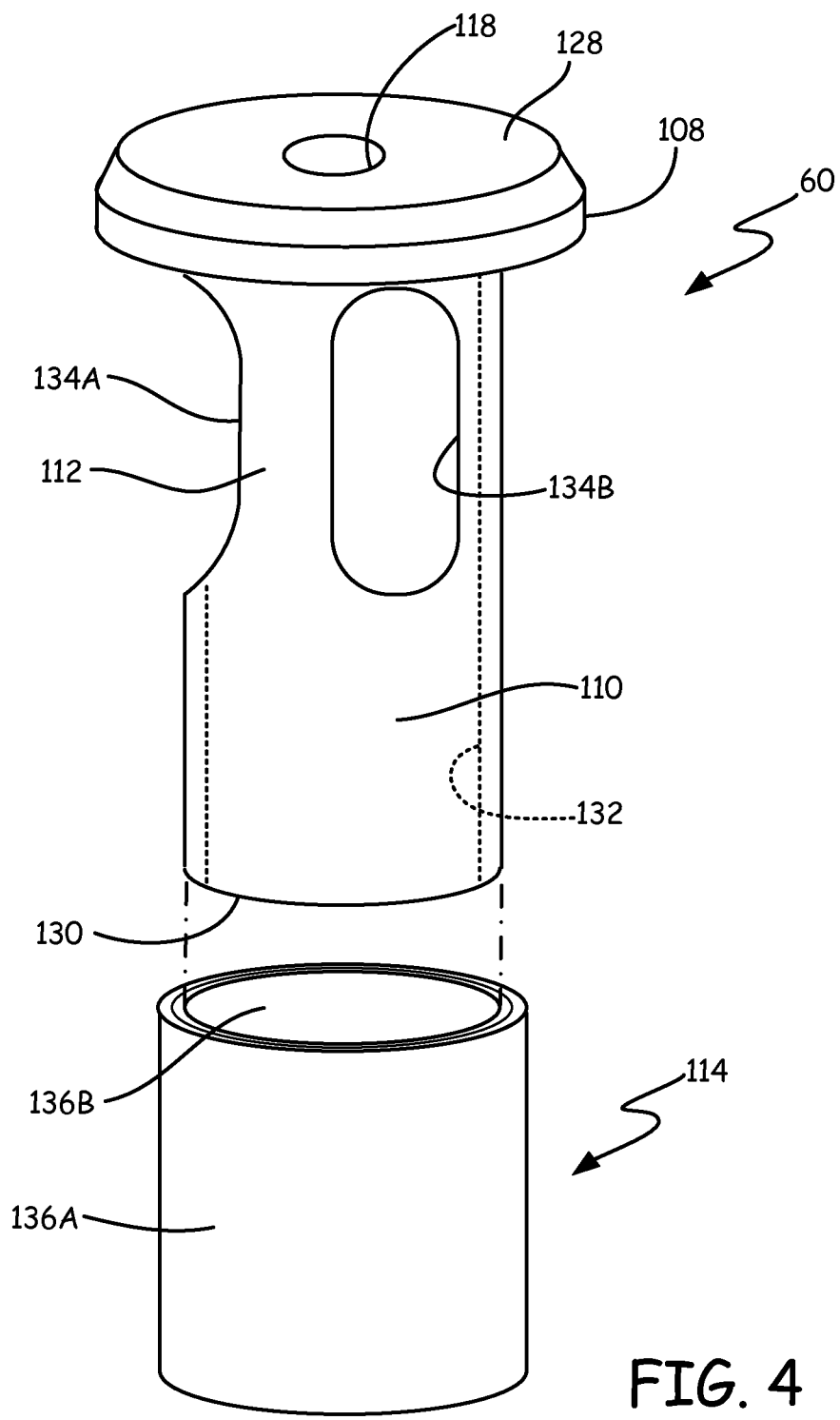
FIG. 4 a perspective view of the tip filter of FIG. 3 wherein a filter media body is positioned around a bearing body.

FIG. 4 an exploded perspective view of tip filter 60 of FIG. 3 wherein filter media 114 is positioned around frame 110. Frame 110 comprises a cylindrical body that is closed at one end by connection to plate 128 and is open at a second end that is distal to the first end. The second end forms outlet 130. Internal wall 132 forms a passage between plate 128 and outlet 130. Outlet 130 is disposed at a full-hoop end section of frame 110. Seal ring 108 circumscribes plate 128 to form a ledge around frame 110. Bore 118 extends through plate 128 to connect to the passage produced by internal wall 132. Window section 112 of frame 110 comprises a plurality of sections of frame 110 in between windows 134A and 134B. In the embodiment depicted, window section 112 comprises three windows (of which only two are seen in FIG. 4) spaced equally around the circumference of frame 110.

Filter media 114 is formed into a cylindrical body that is fit over frame 110. More specifically, filter media 114 is fit over window section 112. Filter media 114 can be force fit over frame 110 such that filter media 114 is held firmly in place within valve body 52A. Filter media 114 may also be adhered or fastened to frame 110. Filter media 114 may comprise any suitable filtration media as is known in the art. For example, filter media 114 may comprise metal or non-metal wire meshes, metal or non-metal wools, sintered materials, or ceramic materials. In one embodiment, filter media 114 comprises a double-layer of filtration media wherein outer diameter layer 136A includes a coarser level of filtration as compared to inner diameter layer 136B.

Windows 134A and 134B are positioned on frame 110 such that, when filter 60 is assembled inside valve body 52A, the windows are positioned across from adhesive inlet port 74. As such, molten hot melt material flows through filter media 114 and windows 134A and 134B, and into the passage formed by internal wall 132. Debris is filtered out of the interior of filter 60. Filter media 114 can be removed from frame 110 for cleaning or replacement, or filter 60 in its entirety can be replaced.

Figure 5:
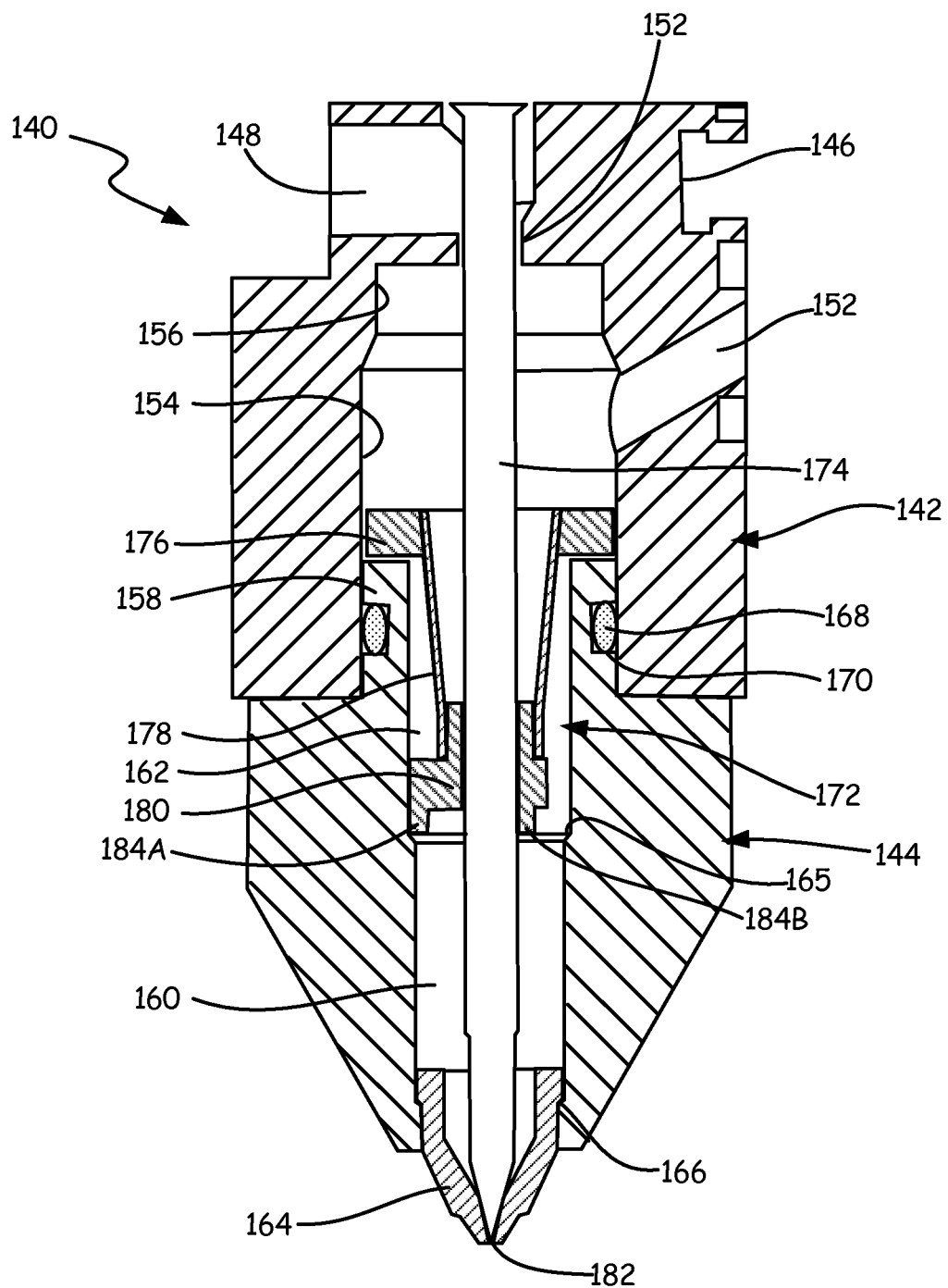
FIG. 5 is a cross-sectional view of another embodiment of a dispense module showing a first embodiment of an inside-out tip filter surrounding a valve stem.

FIG. 5 is a cross-sectional view of another embodiment of a dispense module showing a first embodiment of an inside-out tip filter surrounding a valve stem. Dispense module 140 includes valve body 142 and tip body 144. Valve body 142 includes slot 146, discharge port 148, valve bore 150, fluid inlet port 152, upper valve passage 154 and seal seat 156. Tip body 144 includes collar 158 and lower valve passage 160, which includes counterbore 162 that forms edge 164. Tip body 144 is coupled to seal 168, which is disposed in channel 170, and tip 164, which engages shelf 166 in lower valve passage 160. Filter 172 surrounds valve stem 174 and includes seal ring 176, filter media 178 and bearing 180.

Slot 146 joins to a mating flange on a manifold to assist in aligning holes for the flow of melted hot melt material and compressed air between manifold 40 and module 42 (FIG. 1). Collar 158 of tip body 144 is inserted into upper valve passage 154 of valve body 152. Seal 168 is positioned between collar 158 and upper valve passage 154 to prevent leakage of fluid from between valve body 142 and tip body 144. Tip 164 is positioned within lower valve passage 160 and includes a flange or lip that engages shelf 166 to prevent tip 164 from passing through lower valve passage 160. Tip 164 comprises an annular body having orifice 182. Tip 164 and tip body 144 function similarly to tip cap 54A and discharge port 158A of FIG. 3. Filter 172 is positioned within counterbore 162 of lower valve passage 160 such that seal ring 176 sits atop collar 158. Additionally, bearing 180 comprises a hoop from which prongs 184A, 184B and 184C (FIG. 7) extend. Prongs 184A-184C are configured to rest on edge 165. In one embodiment, bearing 180 includes three prongs that are spaced equally apart around bearing 160 such that counterbore 162 remains in fluid communication with lower valve passage 160. In other embodiments, prongs 184A and 184B are spaced from edge 165 and only engage edge 165 if filter media 178 becomes stretched or deformed. Filter media 178 connects seal ring 176 with bearing 180. Valve stem 174 extends through discharge port 148 and bore 152, through upper valve passage 154, through filter 60 and into tip 164 to engage orifice 182. Assembled as such, a fluid path is formed between fluid inlet 152 and orifice 184 that passes through filter 172.

Valve stem 174 is retracted from orifice 184 to permit flow of molten hot melt material through the fluid path between fluid inlet 152 and orifice 184. A valve actuator (not shown), as is known in the art, is connected to valve stem 174 to linearly displace valve stem 174. Discharge port 148 releases compressed air used to actuate valve stem 174. Molten hot melt adhesive from fluid inlet 152 flows into upper valve passage 154. A seal, such as a U-cup seal, can be positioned within seal bore 156 to prevent molten hot melt material from passing into discharge port 148. The molten hot melt material then flows into seal ring 176 to an interior space defined by filter media 178. Seal ring 176 rests atop collar 158 and the outer diameter of seal ring 176 can engage surfaces of upper valve passage 154 to prevent molten hot melt material from bypassing filter 172. Molten hot melt material then flows through filter media 178 and around the outside of bearing 180, passing between prongs 184A and 184B. Finally, molten hot melt material flow through lower valve passage 160 and into tip 164, whereby the material can exit dispense module 140 when valve stem 174 is retracted away from orifice 182.

In the embodiment depicted in FIG. 5, filter 172 comprises an inside-out filter in which filtered matter is prevented from leaving filter 172 and is left inside of filter 172. More specifically, molten hot melt material passes through filter media 178 from the inside and passes into the interior of tip body 144. Debris and particles screened-out by filter media 178 collect within filter media 178. Tip body 144 is removed from valve body 142 to clean filter media 178 or replace filter 172 and remove collected particles from inside of filter media 178. Filter 172 in its entirety is removed from tip body 144 for cleaning or replacement.

Figure 6:
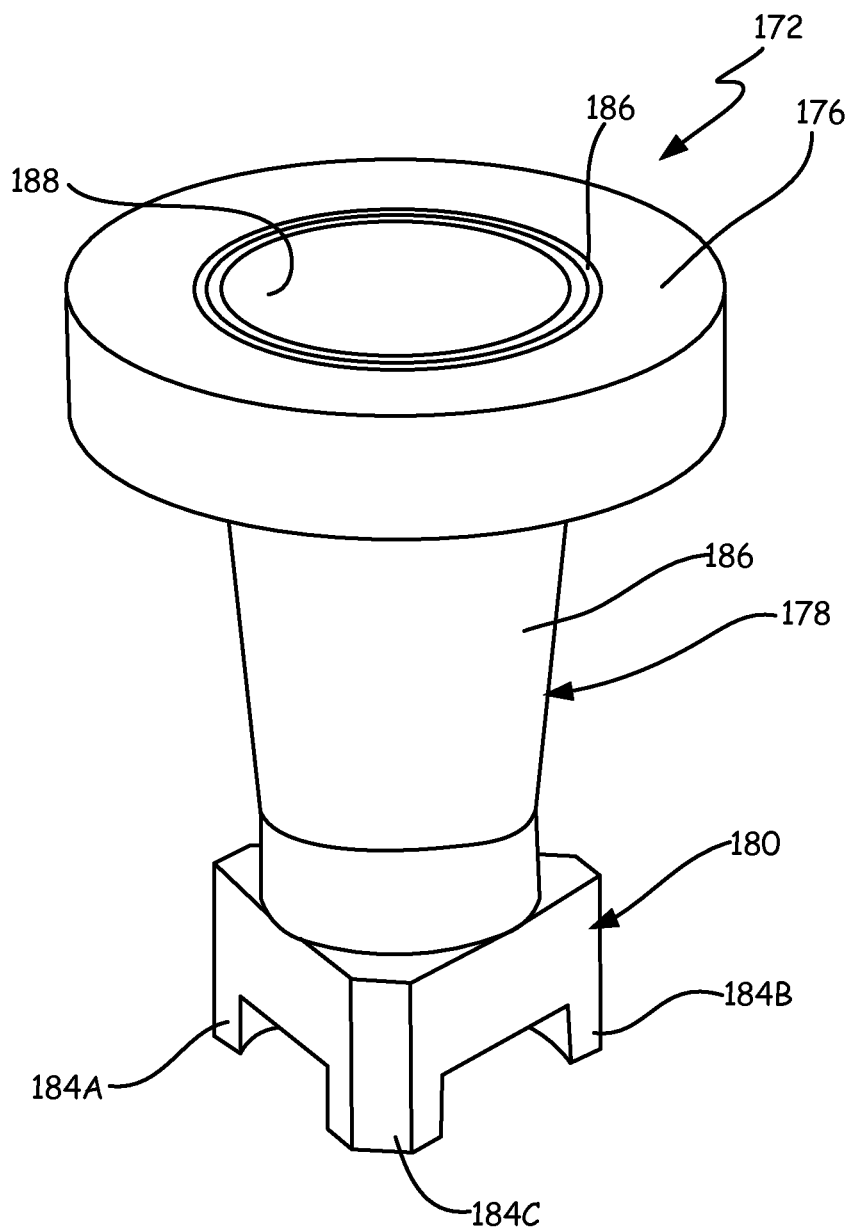
FIG. 6 is a perspective view of the tip filter of FIG. 5 showing a filter media body having a seal ring disposed at an upper end and an internal bearing disposed at a lower end.
Figure 7:
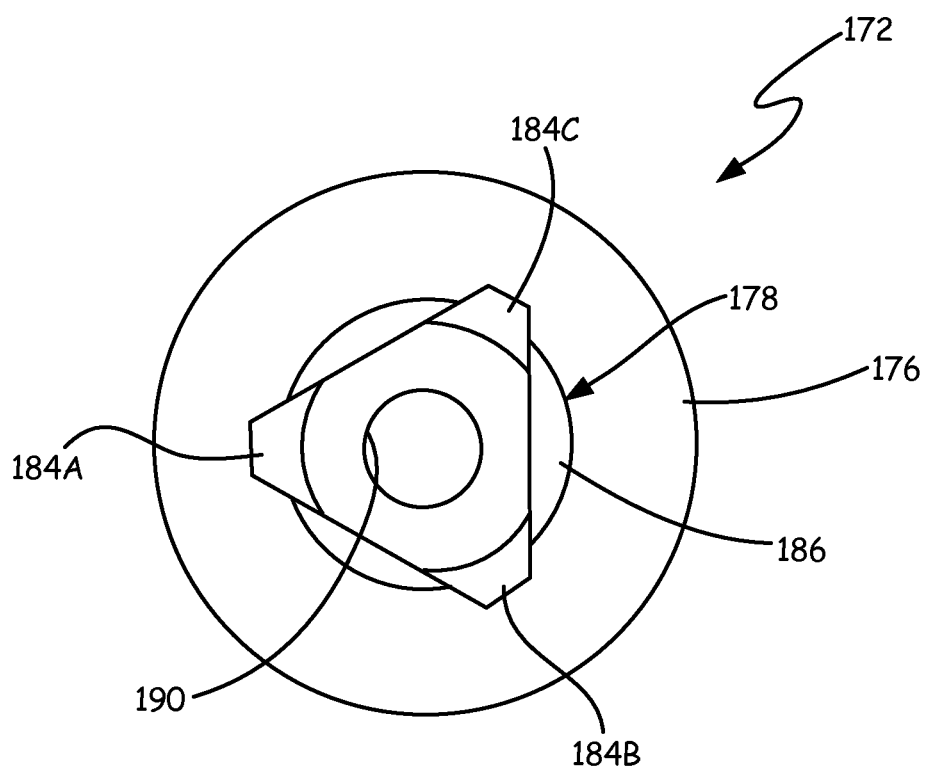
FIG. 7 is a bottom view of the tip filter of FIG. 6 showing prongs extending from the internal bearing.

FIG. 6 is a perspective view of tip filter 172 of FIG. 5 showing filter media 178 having seal ring 176 disposed at an upper end and internal bearing 180 disposed at a lower end. FIG. 7 is a bottom view of tip filter 172 of FIG. 6 showing prongs 184A-184C extending from internal bearing 180. FIGS. 6 and 7 are discussed concurrently. Filter media 178 comprises a double-layer of filtration media comprising outer layer 186 and inner layer 188. In other embodiments filter media 178 may be only a single layer. Seal ring 176 and internal bearing 180 are joined to filter media 178 using various methods. In embodiment disclosed with reference to FIG. 6, seal ring 176 and internal bearing 180 are brazed or welded to filter media 178. In such an embodiment, seal ring 176, filter media 178 and internal bearing 180 are formed of metals, metal alloys or other metallic materials.

Seal ring 176 comprises an annular body that is attached to an edge of filter media 178. In the depicted embodiment, seal ring 176 comprises a ring having a rectilinear cross-section. Such a configuration allows seal ring 176 to rest flush on collar 158 of tip body 144 (FIG. 5). Additionally, as can be seen in FIG. 5, the rectilinear configuration allows seal ring 176 to extend flush across filter media 178, which facilitates attachment of seal ring 176 to filter media 178.

In the depicted embodiment, internal bearing 180 comprises a generally triangular body that forms three points, which correspond to three prongs 184A-184C. Valve bore 190 (FIG. 7) extends through internal bearing 180 to allow valve stem 174 (FIG. 5) to pass through filter 172 and internal bearing 180. In one embodiment, valve bore 190 is sized to form a slip fit that permits valve stem 174 to slide freely within bore 190. However, the gap between valve stem 174 and valve bore 190 is smaller than the mesh or filtration size filter 172.

Prongs 184A-184C extend from the lower (with reference to the orientation of FIG. 6) surface of internal bearing 180 so as to provide intermittent extensions that engage edge 164 (FIG. 5) to prevent filter 172 from falling into lower valve passage 160 (FIG. 5). The outer diameter (with reference to a central axis that extends through valve bore 90) surfaces of prongs 184A-184C contact counterbore 162 (FIG. 5) to position valve bore 90 centrally within lower valve passage 160 (FIG. 5). Thus, internal bearing 180 facilitates central alignment of valve stem 172 within filter 172 and lower valve passage 160 to provide proper engagement with orifice 182 in tip 164 (FIG. 5). Prongs 184A-184C are intermittent so as to not encompass the entire circumference of internal bearing 180. Thus, molten hot melt material from within filter media 178 is permitted to pass around the outside of internal bearing 180. Internal bearing 180 may have other configurations that produce intermittent engagement with counterbore 184 and edge 164. For example, internal bearing may be square shaped having four prongs extending from the four corners of a square body.

Figure 8:
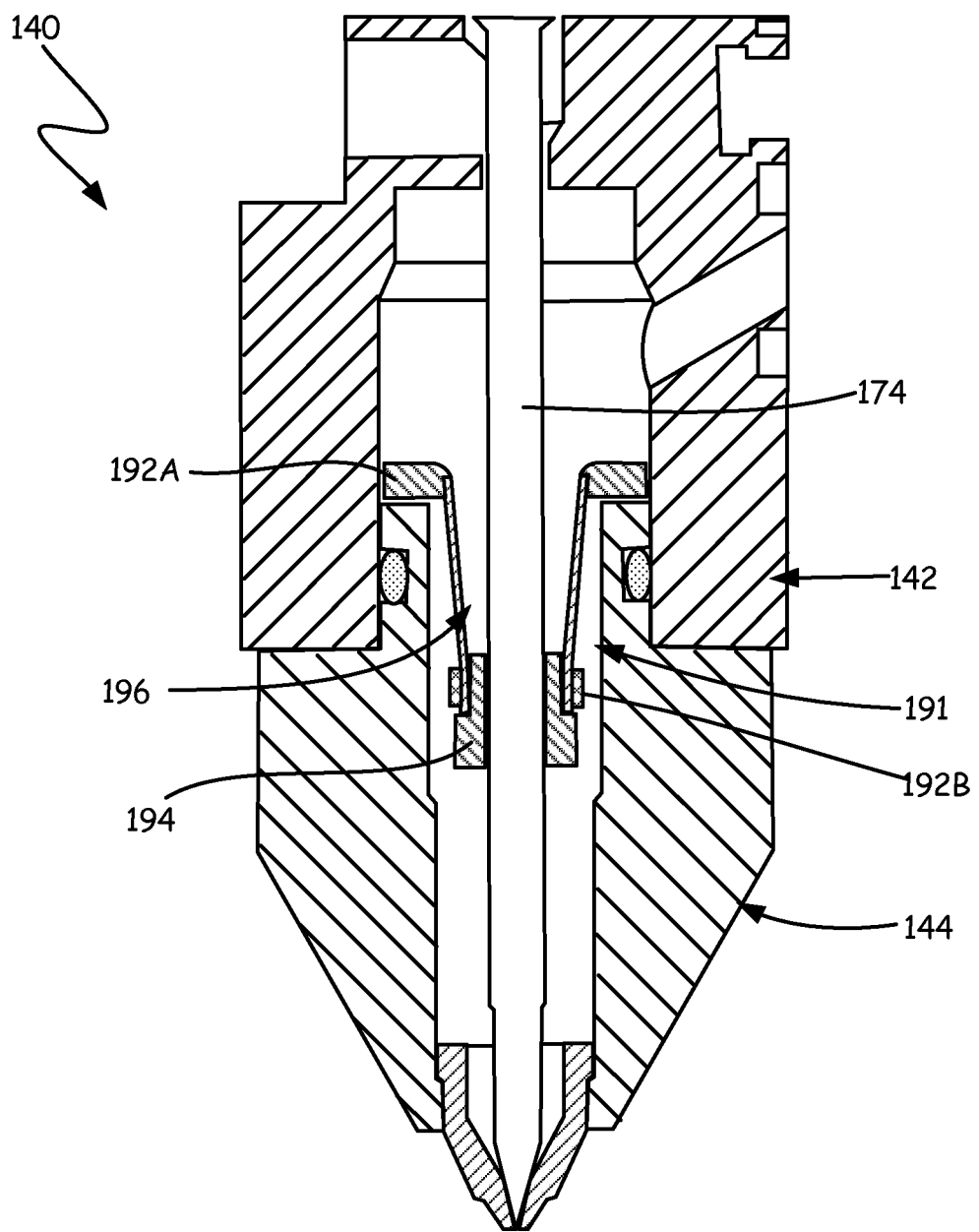
FIG. 8 is a cross-sectional view of a dispense module showing a second embodiment of an inside-out tip filter comprising injection molded seal rings and an internal bearing.

FIG. 8 is a cross-sectional view of dispense module 140 showing a second embodiment of inside-out tip filter 191 comprising injection molded seal rings 192A and 192B and internal bearing 194. Valve body 142 and tip body 144 of dispense module 140 are the same as those of FIG. 5. Seal rings 192A and 192 are manufactured directly onto filter media 196, which is substantially similar to filter media 178 of FIG. 5. For example, seal rings 192A and 192B may be directly injection molded onto filter media 196. As such, seal rings 192A and 192B may be formed of a plastic or polymer material. In other embodiments, seal rings 192A and 192B may be cast onto filter media 196 and may be formed of metal, metal alloys or metallic materials.

Seal ring 192A performs the same function as that of seal ring 176 of FIG. 5. Specifically, seal ring 192A rests on tip body 144 to support filter 191. Seal ring 192B serves as a mating piece for joining internal bearing 194 to filter media 196. For example, seal ring 192B is integrally joined to filter media 196 and thereby serves as a stiffener for filter media 196. Seal ring 192B also permits internal bearing 194 to be mechanically joined, such as through a force fit or snap fit, to filter 191. Filter 191 collects particles within filter media 196 and the entirety of filter 191 is removed from tip body 144 for cleaning or replacement.

Figure 9:
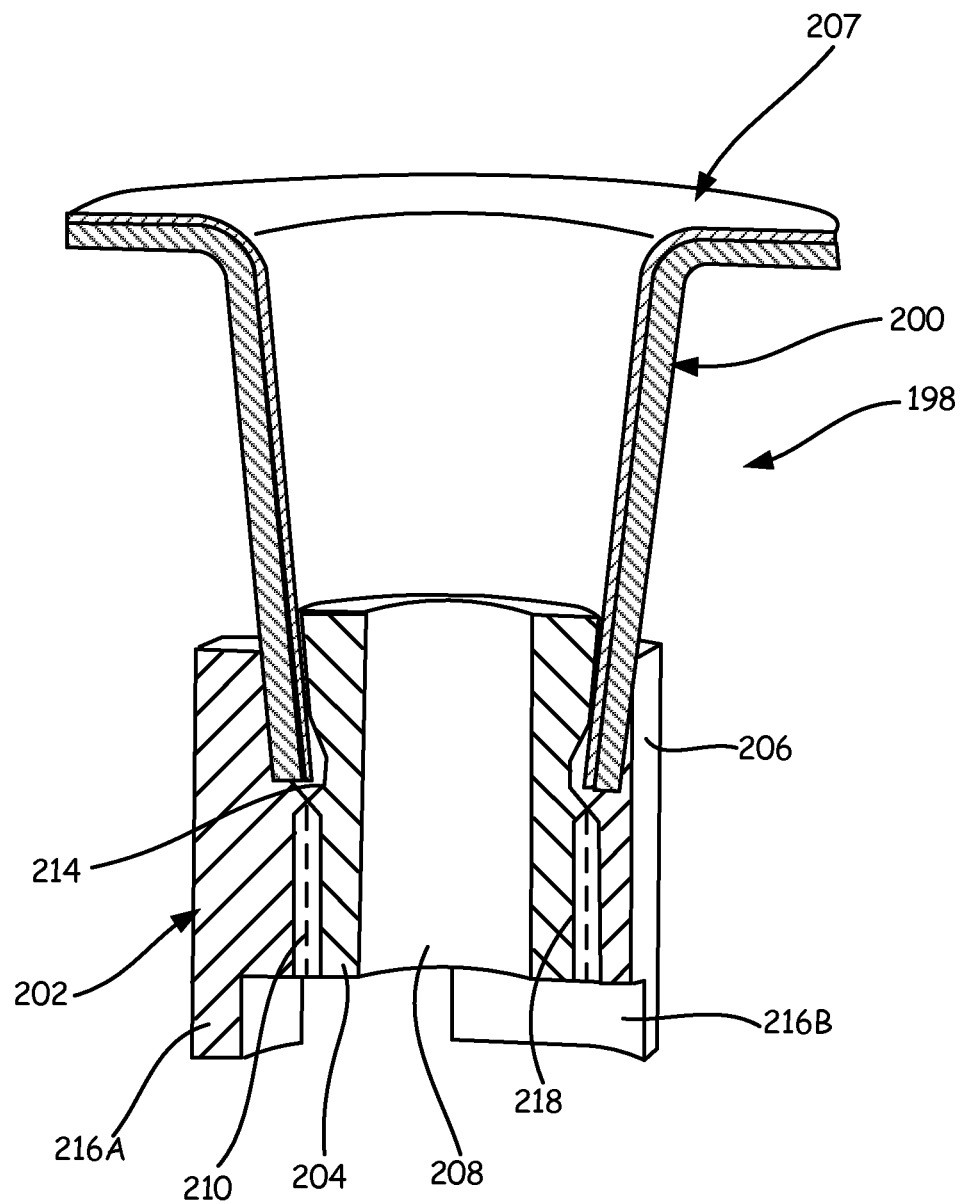
FIG. 9 is a cross-sectional view of a third embodiment of an inside-out tip filter in which the filter media is mechanically connected to an external bearing.

FIG. 9 is a cross-sectional view of a third embodiment of inside-out tip filter 198 in which filter media 200 is mechanically connected to external bearing 202. External bearing 202 comprises bearing body 204 and support body 206. Filter 198 is supported within dispense module 140 (FIG. 5) via flange 207 surrounding filter media 200. Flange 207 comprises a portion of filter media 200 that is bent radially outward (with reference to a central axis extending through the interior of filter media 200) so as to be able to engage collar 158 (FIG. 5). Thus, filter 198 is suspended within dispense module 140 via flange 207, similarly to how seal ring 176 functions.

Bearing body 204 comprises a cylindrical piece that can be fitted into filter media 200. Bearing body 204 includes valve bore 208 for receiving valve stem 174 (FIG. 8). The outer diameter of bearing body 204 also includes ridges 210. Support body 206 includes internal bore 214 into which filter media 200 is inserted from one end and into which bearing body 204 is inserted from the opposite end. Support body 206 also includes prongs 216A and 216B, which function similarly as prongs 184A and 184B (FIG. 5) to engage edge 164 (FIG. 5). Additionally, support body 206 includes slots 218, which are configured to engage with ridges 210 of bearing body 204. As such, with filter media 210 inserted into support body 206, bearing body 204 is pushed into support body 206 such that ridges 210 and slots 218 are tightly engaged. Ridges 210 and slots 218 may be configured as a spline that engages over a force fit or snap fit. In other embodiments, bearing body 204 and support body 206 may be joined by a threaded engagement. With bearing body 204 and support body 206 assembled as such, filter media 200 is pinched therebetween causing external bearing 202 to be mechanically joined to filter media 200. Bearing body 204 can be removed from support body 206 so that filter media 200 can be cleaned or replaced. Alternatively, the entirety of filter 198 can be discarded and replaced.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:
1. A fluid dispensing valve comprising:
  a module having:
    a fluid inlet;
    a fluid outlet; and
    a fluid passage connecting the fluid inlet and the fluid outlet;

a discharge orifice in fluid communication with the fluid outlet;
a valve stem extending into the fluid passage to close-off the discharge orifice; and
a filter disposed within the fluid passage and surrounding the valve stem;
wherein the filter includes an annular body having:
an inlet end opening to the fluid inlet;
an outlet end facing the discharge orifice; and
wherein the annular body comprises a frusto-conical body having:
a large-diameter end comprising the inlet end; and
a small-diameter end comprising the outlet end.

2. The fluid dispensing valve of claim 1 wherein the filter comprises a double-layer of mesh screen.

3. The fluid dispensing valve of claim 1 wherein the filter further includes:
a bearing connected to the small-diameter end and surrounding the valve stem.

4. The fluid dispensing valve of claim 3 wherein:
the bearing is sized to produce a slip fit forming a gap around the valve stem; and
the filter has a mesh size that is larger than the gap.

5. The fluid dispensing valve of claim 3 wherein the bearing includes prongs extending towards the discharge port to engage an edge along the fluid passage.

6. The fluid dispensing valve of claim 3 wherein the filter further includes:
a seal ring connected to the inlet end and engaged with the passage.

7. The fluid dispensing valve of claim 6 wherein the bearing and the seal ring are soldered to the filter.

8. The fluid dispensing valve of claim 6 wherein the seal ring comprises a portion of the filter bent outward to form a flange.

9. The fluid dispensing valve of claim 6 wherein the filter further includes:
a stabilizing ring surrounding the filter outside of the bearing.

10. The fluid dispensing valve of claim 9 wherein the seal ring and stabilizing ring are injected molded onto the filter.

11. The fluid dispensing valve of claim 9 wherein the bearing and the stabilizing ring are force fit together to join to the filter.

12. The fluid dispensing valve of claim 6 wherein the module comprises:
a valve housing forming a first portion of the fluid passage that intersects the fluid inlet; and
a tip housing forming a second portion of the fluid passage that is joined to the first portion of the fluid passage;
wherein the seal ring is positioned between the first portion and the second portion to filter fluid passing from the first portion to the second portion.

13. The fluid dispensing valve of claim 12 wherein:
the first portion of the fluid passage has a first diameter;
the second portion of the fluid passage has a second diameter smaller than the first; and
the tip housing includes a collar sized to be received by the first portion, the second portion extending through the collar to join with the first portion.

14. The fluid dispensing valve of claim 1 wherein a clearance between the filter and the valve stem forms a gap that provides filtration.

15. A fluid dispensing valve comprising:
a module body having:
a fluid passage extending along an axis between a sealed first end and an open second end; and
a fluid inlet intersecting the fluid passage between the sealed first end and the open second end;
a tip cap comprising:
a collar extending into the open second end;
a discharge port extending from the collar;
a discharge orifice disposed in the discharge port;
a valve stem comprising:
a shaft extending into the sealed first end and out of the open second end; and
a tip for engaging the discharge orifice; and
an annular filter surrounding the shaft within the fluid passage to intercept fluid flow between the fluid inlet and the discharge orifice, wherein the filter comprises:
an annular filter media body;
a seal ring connected to a first end of the annular filter media body to engage the fluid passage; and
a bearing connected to a second end of the annular filter media body to receive the valve stem.

16. The fluid dispensing valve of claim 15 wherein:
the annular filter media body is conical in shape; and
the bearing includes prongs extending away from the filter media body.

17. A hot melt dispensing system comprising:
a container for storing hot melt pellets;
a melter capable of heating hot melt pellets into a liquid adhesive;
a feed system for transporting hot melt pellets from the container to the melt system; and
a dispensing system for administering liquid adhesive from the melt system, the dispensing system comprising:
a manifold that receives liquid adhesive from the melt system; and
a module comprising:
a valve stem; and
a filter surrounding the valve stem within the module, wherein the filter comprises:
an annular filter media body;
a seal ring connected to a first end of the annular filter media body to engage the fluid passage; and
a bearing connected to a second end of the annular filter media body to receive the valve stem.

18. The hot melt dispensing system of claim 17 wherein the module further comprises:
a fluid inlet for receiving liquid adhesive;
a fluid passage through which the valve stem extends; and
a discharge orifice that receives liquid adhesive from the fluid passage and through which the valve stem controls flow;
wherein the filter is positioned in the fluid passage between the fluid inlet and the discharge orifice.

19. A filter for a dispensing module, the filter comprising:
a seal ring;
a hoop spaced from the seal ring;
a filter media connecting the seal ring and the hoop;
a valve stem bearing connected to either the seal ring or the hoop to guide a valve stem through the filter; and
a support body comprising:
a first end connected to the seal ring;
a second end connected to the hoop;
a cover connected to the first end and the seal ring to define the valve stem bearing; and
a plurality of windows extending through the support body between the seal ring and the hoop;
wherein the filter media is disposed over the support body across the plurality of windows.

20. A filter for a dispensing module, the filter comprising:
a seal ring;

a hoop spaced from the seal ring;
a filter media connecting the seal ring and the hoop; and
a valve stem bearing connected to either the seal ring or the hoop to guide a valve stem through the filter;
wherein the filter media comprises an conical body; and
wherein the valve stem bearing comprises an inner surface of the hoop.

21. A filter for a dispensing module, the filter comprising:
a seal ring;
a hoop spaced from the seal ring;
a filter media connecting the seal ring and the hoop; and
a valve stem bearing connected to either the seal ring or the hoop to guide a valve stem through the filter;
wherein the valve stem engages the seal ring or the hoop at slip fit forming a gap; and
wherein the filter media has a mesh size that is larger than the gap.

\* \* \* \* \*

UNITED STATES PATENT AND TRADEMARK OFFICE
CERTIFICATE OF CORRECTION

PATENT NO. : 8,893,930 B2  
APPLICATION NO. : 13/660094  
DATED : November 25, 2014  
INVENTOR(S) : Tix et al.

Page 1 of 1

It is certified that error appears in the above-identified patent and that said Letters Patent is hereby corrected as shown below:

Title Page, Item (72) Inventors, should read

-- (72) Inventors: Joseph E. Tix, Hastings, MN (US); Mark T. Weinberger, Mounds View, MN (US); Daniel P. Ross, Maplewood, MN (US); Paul R. Quam, Brooklyn Center, MN (US); John S. Lihwa, Willowick, OH (US); Andrew M. Spiess, Forest Lake, MN (US) --.

Signed and Sealed this  
Third Day of May, 2016

Michelle K. Lee  
*Director of the United States Patent and Trademark Office*